J. BROWER.
FLEXIBLE HARROW.
APPLICATION FILED MAR. 3, 1910.
965,796.
Patented July 26, 1910.
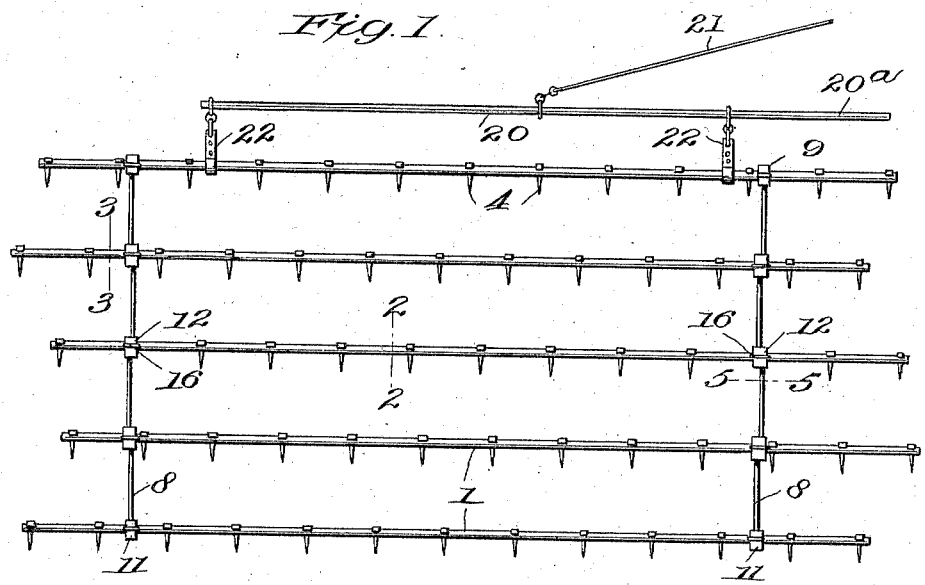
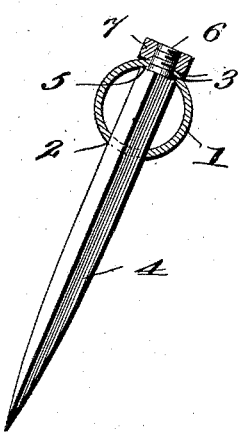
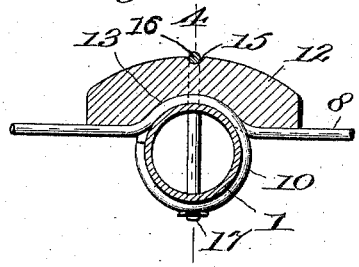
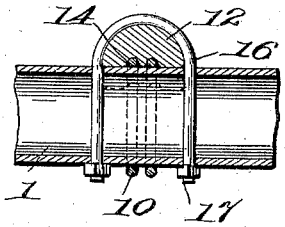
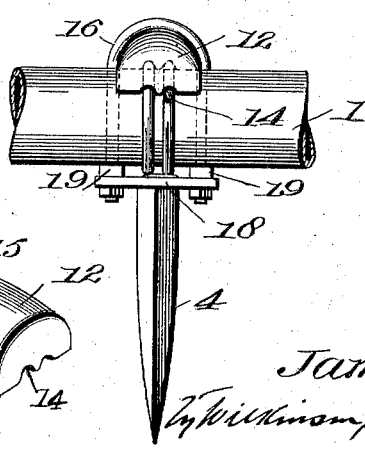
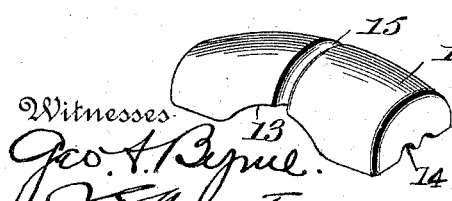
Witnesses
Geo. A. Byrne.
J. S. Ninsto.
Inventor
James Brower
by Wilkinson, Fisher & Witherspoon
his Attorneys
THE NORRIS PETERS CO., WASHINGTON, D. C.

UNITED STATES PATENT OFFICE.

JAMES BROWER, OF WEBSTER CITY, IOWA.

FLEXIBLE HARROW.

965,796. Specification of Letters Patent. Patented July 26, 1910.

Application filed March 3, 1910. Serial No. 547,078.

*To all whom it may concern:*

Be it known that I, JAMES BROWER, a citizen of the United States, residing at Webster City, in the county of Hamilton and State of Iowa, have invented certain new and useful Improvements in Flexible Harrows; and I do hereby declare the following to be a full, clear, and exact description of the invention, such as will enable others skilled in the art to which it appertains to make and use the same.

This invention relates to improvements in harrows, and the primary object is to produce a flexible drag in which the tine bars are fixedly spaced apart but are capable of limited movement longitudinally and in vertical planes relatively to each other.

In harrows, for instance, where the teeth themselves are flexible it is obvious that the teeth become distorted, twisted and broken and gather up weeds and trash. My invention, however, provides for rigid teeth, any obstruction or unevenness of surface being compensated for by the flexible mounting of each independent tine bar.

It will be understood that the invention is not restricted to the exact details shown and described, but for the purpose of disclosure reference is had to the accompanying drawings and following description, and the particular features of novelty will be more succinctly pointed out in the claims.

It will also be understood that while I have only shown one section of a harrow, a plurality of sections may be coupled up in practice.

In the drawings like characters designate the same parts in the several views, in which—

Figure 1 is a plan view of my improved harrow section. Fig. 2 is a detail cross sectional view on line 2—2 of Fig. 1. Fig. 3 is a similar view on the line 3—3. Fig. 4 is a view in section taken on line 4—4 of Fig. 3. Fig. 5 is a detail view taken on the line 5—5 of Fig. 1, and Fig. 6 is a detail perspective view of one of the binding blocks.

1 designates a plurality of tine bars, having teeth affixed thereto. In the drawings these bars 1 consist of cylindrical piping having rectangular orifices 2 in their underneath faces and alining circular orifices 3, of lesser dimension than the orifices 2, in their upper faces.

4 designates the tines or teeth of metal, the body portion being rectangular in cross section, the upper end being reduced to form an abutting shoulder 5, and threaded cylindrical shank or projection 6 adapted to receive a nut 7 for rigidly securing the detachable teeth in place, as clearly illustrated in Fig. 2.

The bars 1 are held spaced apart, and in the drawings the coupling means for doing this consists of the inextensible rods 8 of resilient metal, secured at one end, as at 9, to the front tine bar, thence extending rearwardly and coiled around the next adjacent bar, as at 10, and so on to the rear tine bar, where the other end is secured, as at 11, the coils 10 being held against displacement by the binding blocks 12 provided with the central hollow porton 13 and longitudinal grooves 14 in their underneath faces, and with the transverse central groove 15 on their upper faces, the grooves 14 forming seats for the coils 10, and the grooves 15 forming seats for the U-shaped binding links 16, which pass through the bars 1 and are threaded at their ends to receive the nuts 17.

From the foregoing paragraph it will be seen that the flexibility of the rods 8 will permit a whole tine bar or one end thereof to be moved in a vertical direction against spring tension, and independently of any other tine bar, and also the lateral flexibility of the rods 8 will permit the tine bars to be moved axially independently of each other and against spring tension.

In Fig. 5 is illustrated a means of connecting a tooth where it happens to be disposed beneath the coupling members. In this construction it will be observed that the tooth 4 is carried by a plate 18, spaced from the bar 1 by spacing blocks 19, the plate 18 being apertured to receive the ends of the link 16.

The front tine bar may be connected to an "evener" rod 20, connected by any suitable means 21 to the pulling power.

The connections between the "evener" rod and front tine bar are diagrammatically illustrated at 22, and the right hand end 20$^a$ of the "evener" rod is shown extended, the length of this rod being determined by the number of harrow sections employed.

Having thus described my invention, what I claim is:—

1. In a harrow, the combination of a plurality of bars, a plurality of teeth rigidly connected to said bars, and inextensible laterally flexible spacing couplings rigidly connected to said bars comprising resilient wire rods extending transversely of said bars, and means for securing said rods to said bars, whereby said bars are held spaced apart but are capable of limited longitudinal movement, substantially as described.

2. In a harrow, the combination of a plurality of bars, a plurality of teeth rigidly connected to said bars, and inextensible laterally flexible spacing couplings rigidly connected to said bars comprising resilient wire rods extending transversely of said bars, said wire rods being coiled around said bars, and means for securing said coils to said bars, substantially as described.

3. In a harrow, the combination of a plurality of bars, a plurality of teeth rigidly connected to said bars, and inextensible laterally flexible spacing couplings rigidly connected to said bars comprising resilient wire rods extending transversely of said bars, said wire rods being coiled around said bars, and means for securing said coils to said bars consisting of longitudinally grooved binding blocks and securing links between said blocks and bars, substantially as described.

4. In a harrow, the combination of a plurality of bars, a plurality of teeth rigidly connected to said bars, and inextensible laterally flexible spacing couplings rigidly connected to said bars comprising resilient wire rods extending transversely of said bars, said wire rods being coiled around said bars, and means for securing said coils to said bars consisting of binding blocks provided on their underneath faces with a central hollow and longitudinal grooves and with a central transverse groove on their upper faces, and U-shaped links fitting said transverse grooves and extending through said bars and secured on the underneath faces thereof, substantially as described.

In testimony whereof, I affix my signature, in presence of two witnesses.

JAMES BROWER.

Witnesses:
E. S. BOUDINOT,
ESTHER GREENWOOD.